(12) United States Patent
Nam et al.

(10) Patent No.: US 9,086,748 B2
(45) Date of Patent: Jul. 21, 2015

(54) DUAL DISPLAY APPARATUS AND METHOD OF DRIVING THE SAME

(71) Applicant: Samsung Display Co. Ltd., Yongin-si, Gyeonggi-do (KR)

(72) Inventors: Kee-Hyun Nam, Yongin-si (KR); Yea-Seul Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 114 days.

(21) Appl. No.: 13/685,656

(22) Filed: Nov. 26, 2012

(65) Prior Publication Data

US 2013/0314338 A1 Nov. 28, 2013

(30) Foreign Application Priority Data

May 24, 2012 (KR) .......................... 10-2012-0055531

(51) Int. Cl.
*G06F 3/041* (2006.01)
*G06F 3/0488* (2013.01)
*G06F 1/16* (2006.01)

(52) U.S. Cl.
CPC .............. *G06F 3/041* (2013.01); *G06F 1/1649* (2013.01); *G06F 3/0488* (2013.01); *G06F 2200/1637* (2013.01)

(58) Field of Classification Search
CPC ..... G06F 1/1647; G06F 3/041; G06F 3/0412; G06F 1/169; G06F 1/1613; G06F 1/1616; G06F 1/1641; G06F 3/044; G09G 2360/04
USPC .................... 345/156, 173, 174, 1.1, 1.3, 158
See application file for complete search history.

(56) References Cited

U.S. PATENT DOCUMENTS

| | | |
|---|---|---|
| 2008/0309640 A1 | 12/2008 | Hong |
| 2009/0295731 A1 | 12/2009 | Kim et al. |
| 2009/0295943 A1 | 12/2009 | Kim et al. |
| 2009/0298537 A1 | 12/2009 | Choi |
| 2009/0298546 A1 | 12/2009 | Kim et al. |
| 2009/0298547 A1 | 12/2009 | Kim et al. |
| 2009/0298548 A1 | 12/2009 | Kim et al. |
| 2009/0298554 A1 | 12/2009 | Kim et al. |
| 2010/0182265 A1 | 7/2010 | Kim et al. |
| 2010/0302194 A1 | 12/2010 | Park et al. |

FOREIGN PATENT DOCUMENTS

| | | |
|---|---|---|
| KR | 10-2010-0082451 | 7/2010 |
| KR | 10-0986435 | 10/2010 |
| KR | 10-2010-0129044 | 12/2010 |
| KR | 10-1066736 | 9/2011 |
| KR | 10-2012-0003423 | 1/2012 |

OTHER PUBLICATIONS

Korean Office Action dated Sep. 27, 2013 issued in Korean priority Application No. 10-2012-0055531, 4 pages.

*Primary Examiner* — Regina Liang
(74) *Attorney, Agent, or Firm* — Christie, Parker & Hale, LLP (57) ABSTRACT

A dual display including: a first display for displaying first visual information and receiving a touch input; a second display including a double-sided emission display for displaying second visual information through a first surface or a second surface opposite to the first surface, and receiving a touch input; a sensor for sensing relative locations of the first and second displays; and a controller for determining whether or not the second display is covering the first display according to a signal of the sensor, and for controlling the first and second displays. Here, the controller is configured to receive the touch input from the second display when the second display unit covers the first display, and to receive the touch input from the first display when the second display does not to cover the first display.

20 Claims, 6 Drawing Sheets

DUAL DISPLAY APPARATUS AND METHOD OF DRIVING THE SAME

CROSS-REFERENCE TO RELATED PATENT APPLICATION

This application claims priority to and the benefit of Korean Patent Application No. 10-2012-0055531, filed on May 24, 2012, in the Korean Intellectual Property Office, the disclosure of which is incorporated herein in its entirety by reference.

BACKGROUND

1. Field

Embodiments of the present invention relate to a dual display apparatus and a method of driving the dual display apparatus.

2. Description of the Related Art

Display apparatuses capable of replacing cathode ray tubes have been recently been developed. These display apparatuses include liquid crystal displays (LCDs), field emission displays (FEDs), plasma display panels (PDPs), electro-luminescence (EL) display apparatuses, and the like.

Among the above display apparatuses, PDPs, which have simple structures and manufacturing processes, are recognized as being display apparatuses that make simple and large displays, however, they have low emission efficiency and brightness and high power consumption. Comparatively, active LCDs, to which thin film transistors (TFTs) are applied as switching devices, use semiconductor processes, and are used as small and large display devices. On the other hand, LCDs have high power consumption due to backlight units. Also, in LCDs, a large amount of optical loss occurs due to optical devices such as polarizing filters, prism sheets, diffusion plates, and the like, and viewing angles may be relatively narrow.

EL display apparatuses are largely classified into inorganic EL display apparatuses and organic EL display apparatuses according to materials of emission layers, and are self-emitting apparatuses (i.e., they emit light by themselves). EL display apparatuses have a fast response speed, high emission efficiency and brightness, and wide viewing angles. Among these EL display apparatuses, organic EL display apparatuses including organic light emitting diodes (OLEDs) have a low direct current driving voltage, form a thinner display, emit light uniformly, easily form patterns, have a high emission efficiency, emit substantially all colors in a visible spectrum, and the like, and thus EL apparatuses including OLEDs are undergoing the most active research with respect to applications of display apparatuses.

Furthermore, EL display apparatuses have a fast screen response speed, wide viewing angles, better color expression than LCDs, flexible characteristics, and are applicable to a wide variety of applications. Thus, EL display apparatuses have been used as display panels of portable electronic products such as cellular phones, PDAs, etc. and user demand for EL display apparatuses is increasing in terms of large screens and various usages of large screens of portable electronic products.

SUMMARY

Embodiments of the present invention provide for a dual display apparatus and a method of driving the dual display apparatus.

According to an aspect of the present invention, there is provided a dual display apparatus including: a first display configured to display first visual information and to receive a touch input; a second display including a double-sided emission type display configured to display second visual information through a first surface or a second surface opposite to the first surface, and to receive a touch input; a sensor configured to sense relative locations of the first display and the second display; and a controller configured to determine whether the second display is covering the first display or is not covering the first display according to a signal of the sensor, and configured to control the first display and the second display. Here, the controller is configured to receive the touch input from the second display when the second display unit covers the first display, and to receive the touch input from the first display when the second display does not to cover the first display.

The second display may include an organic light emitting display that is substantially transparent.

One side of the second display may be coupled (e.g., connected) to the first display so that the second display is configured to rotate and move with respect to the first display.

In an embodiment, the sensor includes: a first sensor at one side of the first display; and a second sensor at one side of the second display, wherein the controller is configured to calculate an angle between the first display and the second display according to signals received from the first sensor and the second sensor.

The first sensor and the second sensor may include gyro sensors.

In an embodiment, the controller is configured to activate one of the first display or the second display and to inactivate the other one of the first display or the second display that is not activated when the second display covers the first display, and to activate both the first display and the second display when the second display does not cover the first display.

The controller may be configured to inactivate the first display, to activate the second display, and to control the second display to display menu icons when the second display covers the first display.

The dual display apparatus may further include: a sound sensor configured to sense a sound signal for controlling the dual display apparatus, according to an embodiment of the present invention.

The controller may be configured to activate the first display, to inactivate the second display, and to control the sound sensor to be activated when the second display covers the first display.

The controller may be configured to activate the first display and the second display to output third visual information, which is obtained by overlapping the first visual information and the second visual information, to a user when the second display covers the first display.

According to another aspect of the present invention, there is provided a method of driving a dual display apparatus, the method including: detecting relative locations of a first display and a second display; determining whether or not the second display, which includes a substantially transparent portion, is covering the first display; if it is determined that the second display is covering the first display, activating at least one of the first display or the second display; and if it is determined that the second display is covering the first display, receiving a sound signal or a touch signal.

The activating of the at least one of the first display or the second display may include: activating the first display and inactivating the second display so that first visual information that is output through the first display is output to a user through the substantially transparent portion of the second display.

The receiving of the sound signal or the touch signal may include: receiving the sound signal for controlling the dual display apparatus.

The activating of the at least one of the first display or the second display may include: inactivating the first display and activating the second display.

The receiving of the sound signal or the touch signal may include: receiving the touch signal for controlling the dual display apparatus through a second surface of the second display opposite to a first surface that faces the first display.

The activating of the at least one of the first display or the second display includes: displaying menu icons through the second display, according to an embodiment.

The activating of the at least one of the first display and the second display may include: activating the first display that outputs first visual information; and activating the second display that outputs second visual information.

In an embodiment, the first visual information and the second visual information may overlap at least partially to form third visual information.

The receiving of the sound signal or the touch signal may include: receiving the touch signal for controlling the dual display apparatus through a second surface of the second display opposite to a first surface thereof that faces the first display.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Hereinafter, certain exemplary embodiments according to the present invention are described in detail with reference to the accompanying drawings. However, these exemplarily embodiments are not intended to limit the present invention to particular modes of practice, and it will be appreciated that all changes, equivalents, and substitutes that do not depart from the spirit and scope of the present invention are encompassed in the present invention. In the description of the present invention, certain detailed explanations may be omitted when it is deemed that they may unnecessarily obscure certain aspects of the invention. The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another. As used herein, the term "and/or" includes any and all combinations of one or more of the associated listed items. Expressions such as "at least one of," when preceding a list of elements, modify the entire list of elements and do not modify the individual elements of the list.

Figure 1:
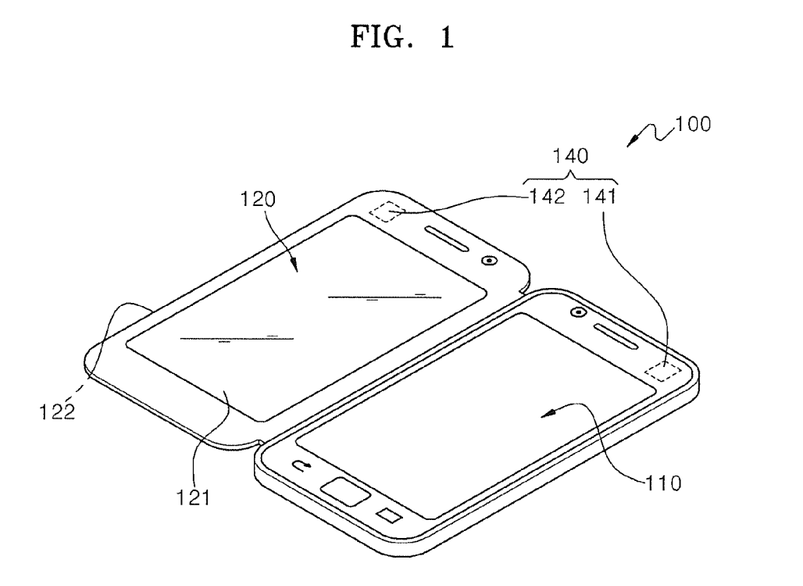
FIG. 1 is a schematic perspective view of a dual display apparatus, according to an embodiment of the present invention.
Figure 2:
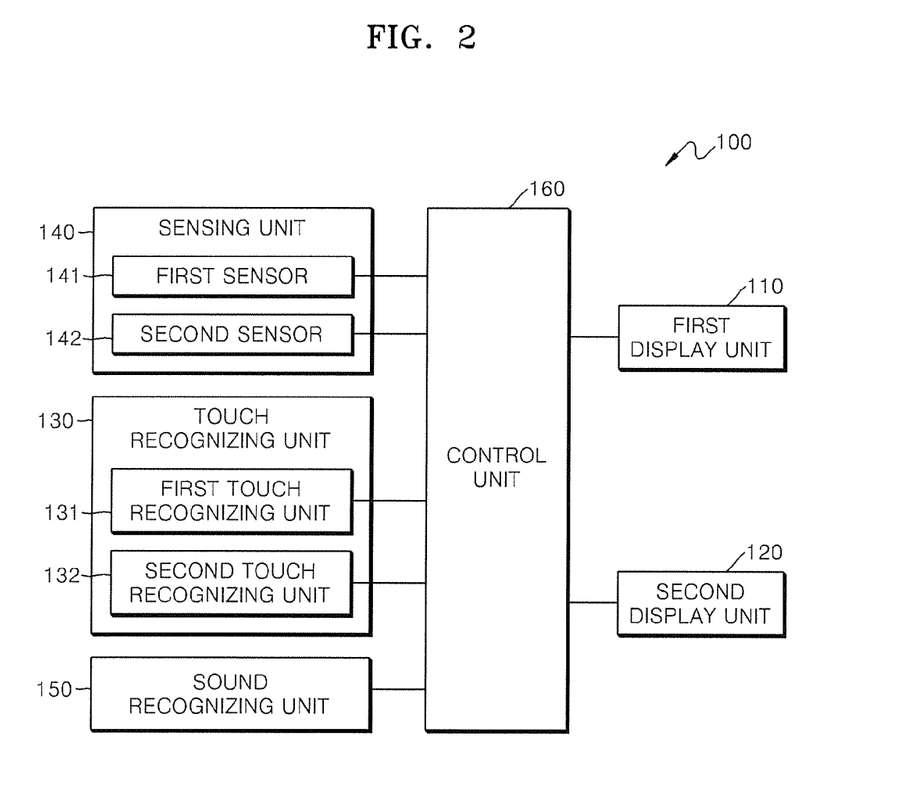
FIG. 2 is a schematic block diagram of a dual display apparatus, according to an embodiment of the present invention.

FIG. 1 is a schematic perspective view of a dual display apparatus 100, according to an embodiment of the present invention. FIG. 2 is a schematic block diagram of the dual display apparatus 100, according to an embodiment of the present invention.

Referring to FIGS. 1 and 2, the dual display apparatus 100 according to an embodiment of the present invention includes a first display unit 110 (first display), a second display unit 120 (second display), a touch recognizing unit 130 (touch sensor), a sensing unit 140 (sensor), a sound recognizing unit 150 (sound sensor), and a control unit 160 (controller).

The first display unit 110 may output image information through one surface thereof. The first display unit 110 may be a liquid crystal device or an organic light emitting display device. The first display unit 110 may recognize a touch. For example, a first touch recognizing unit 131 capable of recognizing a touch input by a user's finger or by using an external input apparatus, such as, a stylus pen, may be included (e.g., integrally formed) with the first display unit 110. The first touch recognizing unit 131 may recognize an external touch input by using a resistive method, a capacitive method, or any other suitable method.

In an embodiment, the second display unit 120 outputs the image information through a first surface 121 thereof facing the first display unit 110 and/or a second surface 122 opposite to the first surface 121 (i.e. a double-sided emission type display). The second display unit 120 may be a transparent display (or a substantially transparent display, a translucent display, a not fully opaque display, or the like). Thus, in a case where the second display unit 120 covers the first display unit 110, a screen of the first display unit 110 may be viewed (recognized) by a user through the transparent second display unit 120.

The second display unit 120 may recognize the touch (e.g., the touch input by the user). For example, a second touch recognizing unit 132 capable of recognizing the touch input by the user's finger or by using the external input apparatus, such as, the stylus pen, may be included (e.g., integrally formed) with the second display unit 120. As an example, the second touch recognizing unit 132 may be formed in both surfaces of the second display unit 120 to recognize a touch input of the first surface 121 of the second display unit 120 and recognize a touch input of the second surface 122 thereof. The second touch recognizing unit 132 may recognize the external touch input by using, for example, the resistive method or the capacitive method (similar to the first touch recognizing unit 131).

In an embodiment, one side of the second display unit 120 is coupled to the first display unit 110 so that the second display unit 120 may rotate and move with respect to the one side coupled to the first display unit 110. According to the rotation and movement of the second display unit 120 with respect to the one side thereof, the second display unit 120 may be disposed to overlap a screen of the first display unit 110 (an overlap position) or may not be disposed to overlap a screen of the first display unit 110 (a non-overlap position). That is, the second display unit 120 is capable of being disposed at the overlap position and may alternatively be disposed at the non-overlap position according to the rotation and movement of the second display unit 120 with respect to the one side thereof.

In an embodiment, the sensing unit 140 senses whether or not the second display unit 120 is disposed at the overlap position or the non-overlap position. The second display unit 120, having one side fixed, rotates with respect to the first display unit 110. In this regard, the sensing unit 140 may determine whether or not the second display unit 120 is disposed to overlap the screen of the first display unit 110 by obtaining a relative movement of the second display unit 120 with respect to the first display unit 110, i.e. a level of rotation of the second display unit 120.

The sensing unit 140 may include a first sensor 141 disposed at one side of the first display unit 110 and a second sensor 142 disposed at one side of the second display unit 120. As an example, the first sensor 141 and the second sensor 142 may be formed to face each other (e.g., face each other when the second display unit is disposed at the overlap position). The first sensor 141 and the second sensor 142 may include gyro sensors so as to sense an angle or an angle variation of the second display unit 120 that changes with respect to the first display unit 110.

In an embodiment, the sound recognizing unit 150 is included in the dual display apparatus 100 in such a way that the dual display apparatus 100 may be driven according to a sound command of a user. The sound recognizing unit 150 may be driven according to relative locations of the first display unit 110 and the second display unit 120. As described above, the first display unit 110 and the second display unit 120 including the first touch recognizing unit 131 and the second touch recognizing unit 132, respectively, may recognize touch inputs and, thus, the dual display apparatus 100 may be driven. However, it may be impractical or impossible to input a touch through the first touch recognizing unit 131 formed in the first display unit 110 when the first display unit is covered by the second display unit 120. In this case, the sound recognizing unit 150 may be activated so that the dual display apparatus 100 may be driven according to the sound command of the user.

In an embodiment of the present invention, the control unit 160 is included (e.g., embedded) in the dual display apparatus 100, detects the relative locations of the first display unit 110 and the second display unit 120 based on sensing information transferred from the sensing unit 140, and accordingly controls driving of the dual display apparatus 100. A detailed operation of the control unit 160 and resultant driving of the dual display apparatus 100 will be described with reference to FIGS. 3 and 6.

Figure 3:
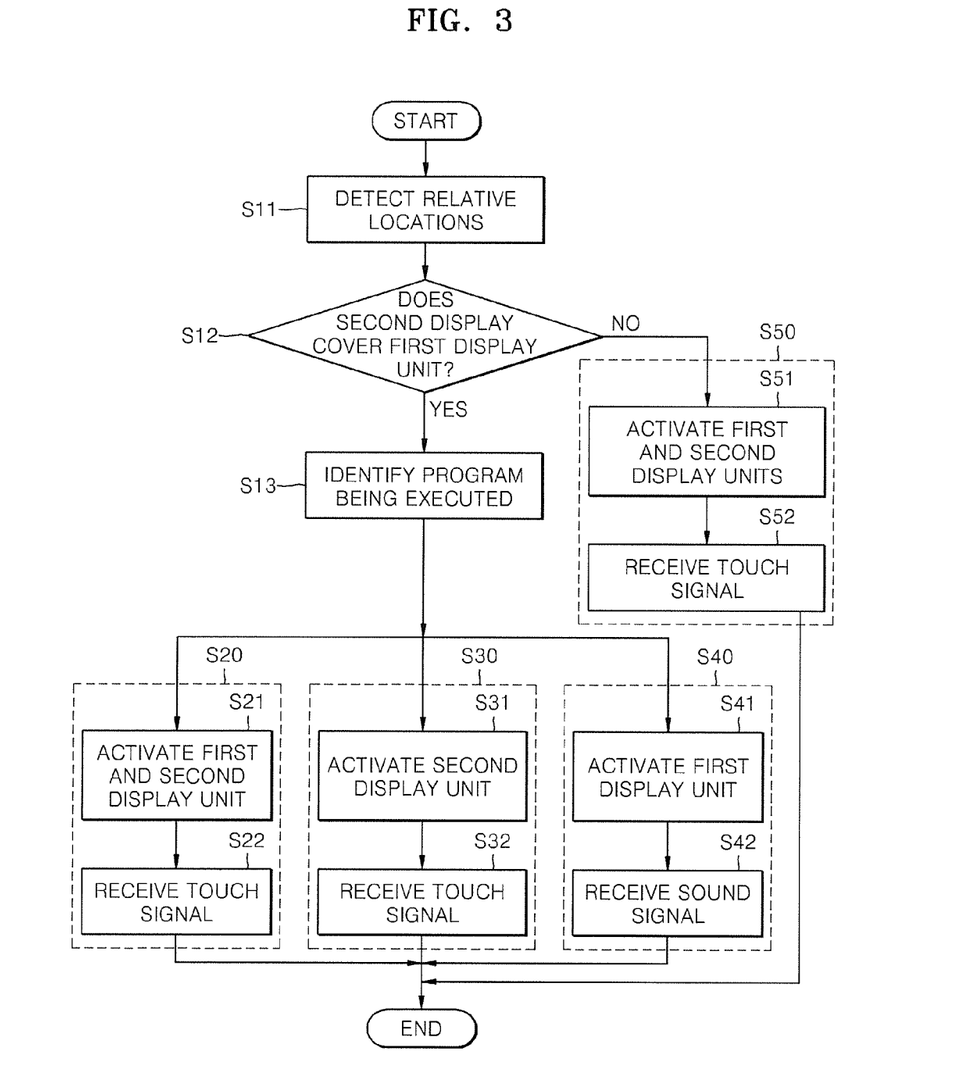
FIG. 3 is a schematic flowchart of driving a dual display apparatus, according to an embodiment of the present invention.
Figure 4:
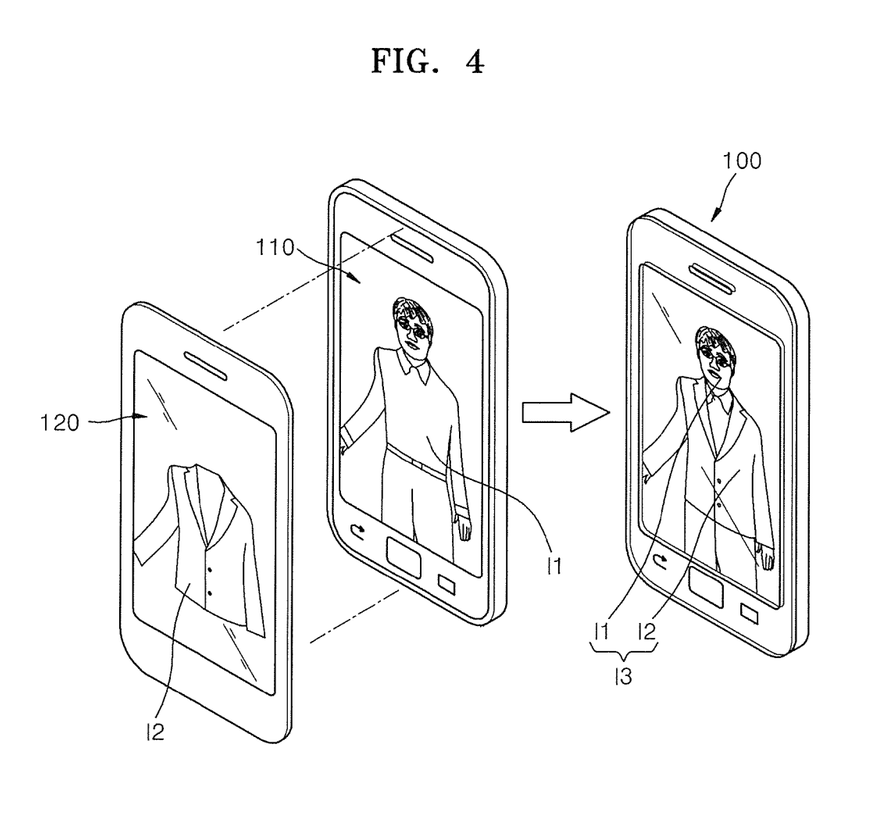
FIG. 4 illustrates a driving status of a dual display apparatus in which a first display unit and a second display unit overlap each other, according to an embodiment of the present invention.
Figure 5:
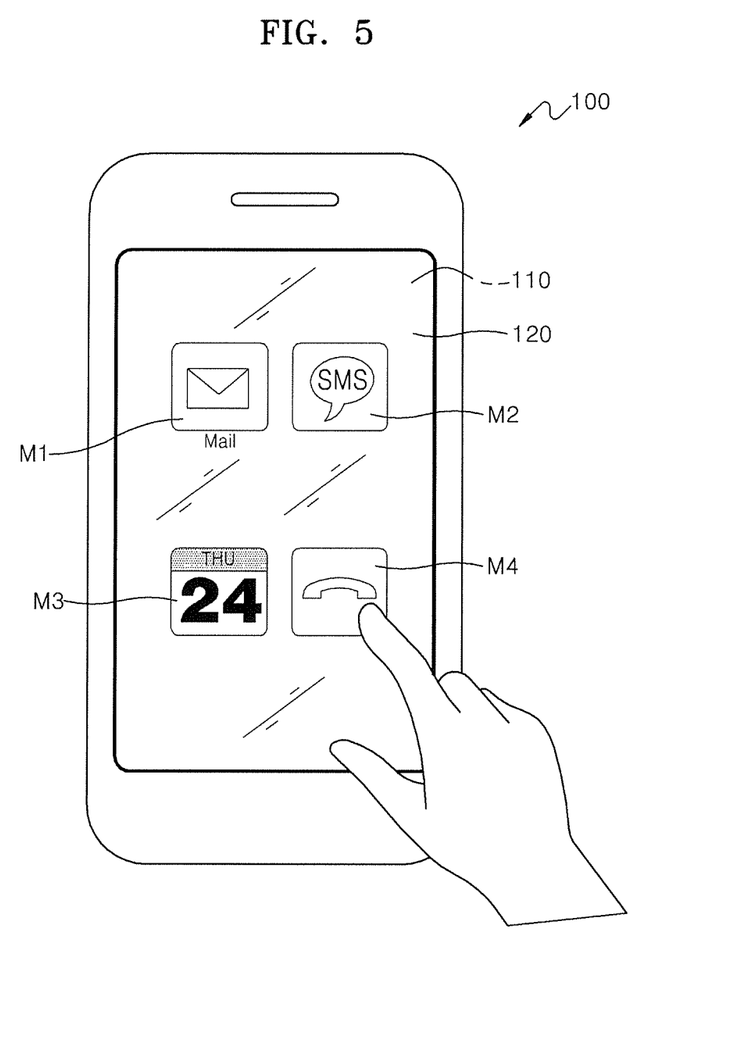
FIG. 5 illustrates a driving status of a dual display apparatus in which a first display unit and a second display unit overlap each other, according to an embodiment of the present invention.
Figure 6:
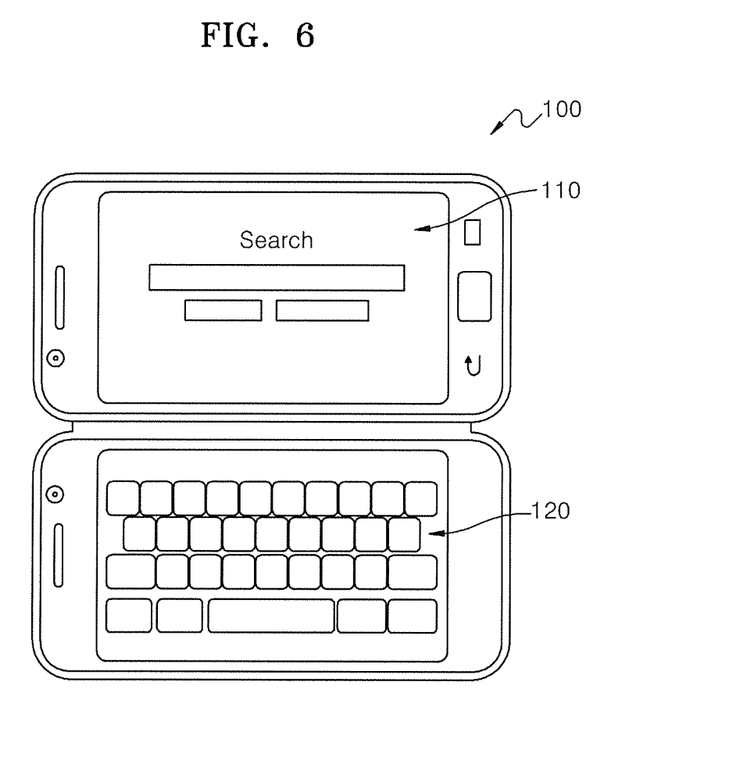
FIG. 6 illustrates a driving status of a dual display apparatus in which a first display unit and a second display unit do not overlap each other, according to an embodiment of the present invention.

FIG. 3 is a schematic flowchart of driving of the dual display apparatus 100, according to an embodiment of the present invention. The dual display apparatus 100 is driven according to a control operation of the control unit 160. FIGS. 4 through 6 illustrate driving statuses of the dual display apparatus 100 with respect to relative locations of the first display unit 110 and the second display unit 120 according to embodiments of the present invention. FIGS. 4 and 5 illustrate driving statuses of the dual display apparatus 100 in which the second display unit 120 is disposed at an overlap position, i.e., the first display unit 110 and the second display unit 120 overlap each other. FIG. 6 illustrates a driving status of the dual display apparatus 100 in which the second display unit 120 is disposed at a non-overlap position, i.e., the first display unit 110 and the second display unit 120 do not overlap each other.

Referring to FIG. 3, in operation S11, relative locations of the first display unit 110 and the second display unit 120 are detected. The control unit 160 may detect the relative operations of the first display unit 110 and the second display unit 120 by receiving respective signals sensed by the first sensor 141 and the second sensor 142. The control unit 160 may then determine whether or not the first display unit 110 and the second display unit 120 overlap each other by detecting an angle between the first display unit 110 and the second display unit 120 based on, for example, sensing values of a gyro sensor included in the first sensor 141 and a gyro sensor included in the second sensor 142. The angle between the first display unit 110 and the second display unit 120 may be detected by integrating angular speeds sensed by the first sensor 141 and the second sensor 142. To prevent an error from occurring in detecting the angle between the first display unit 110 and the second display unit 120, an acceleration sensor may be used with the gyro sensor.

In operation S12, the control unit 160 determines whether the second display unit 120 covers the first display unit 110. The control unit 160 determines whether the second display unit 120 covers the first display unit 110 based on a result of the detection in operation S11. The second display unit 120 may be disposed at the overlap position or the non-overlap position. In respective cases, the control unit 160 may have different operations for controlling the dual display apparatus 100 and methods of recognizing a user command. The case where the second display unit 120 covers the first display unit 110 will now be described.

In operation S13, the control unit 160 identifies a program being executed in the dual display apparatus 100. When the second display unit 120 covers the first display unit 110, since the control unit 160 may control driving of the first display unit 110 and the second display unit 120 according to the program being executed in the dual display apparatus 100, the control unit 160 first identifies the program being executing in the dual display apparatus 100. If the program being executed in the dual display apparatus 100 requires driving of both the first display unit 110 and the second display unit 120, operation S20 is performed. If the program being executed in the dual display apparatus 100 does not require driving of both the first display unit 110 and the second display unit 120, operation S30 or S40 is performed.

A case where operation S20 is performed will now be described. Operation S20 includes operations S21 and S22, according to an embodiment of the present invention.

In operation S21, the control unit 160 activates both the first display unit 110 and the second display unit 120. As an example of a case where the program being executed in the dual display apparatus 100 requires driving of both the first display unit 110 and the second display unit 120 is where both first visual information I1 and second visual information I2 need to be output through the first display unit 110 and the second display unit 120, respectively, to the user. An example of outputting both the first visual information I1 and the second visual information I2 is illustrated in FIG. 4 by a program "putting clothes on".

More specifically, referring to FIG. 4, an image (the first visual information I1) of the user is output through the first display unit 110, and an image (the second visual information I2) of clothes that may be purchased by the user is output through the second display unit 120, and thus the user who uses the dual display apparatus 100 may recognize an image (third visual information I3 obtained by overlapping the first visual information I1 and the second visual information I2) of the user wearing the clothes.

As described above, in a case where a program for determining whether clothes suit the user before the user purchases the clothes operates, the control unit 160 may activate both the first display unit 110 and the second display unit 120. The first visual information I1 and the second visual information I2 may be output through the first display unit 110 and the second display unit 120, respectively, and then the user may recognize the third visual information I3 obtained by overlapping the first visual information I1 and the second visual information I2.

Although the image of the user wearing the clothes is provided as the third visual information I3 through the dual display apparatus 100 by outputting the image of the user corresponding to the first visual information I1 and the image of clothes corresponding to the second visual information I2 in the present embodiment, the present invention is not limited thereto. For example, in another embodiment, first visual information I1 is output through the first display unit 110, and second visual information having a different size from the first visual information I1 or disposed slightly obliquely while being similar to the first visual information I1 is output through the second display unit 120, and thus third visual information having a cubic effect and obtained by overlapping the first visual information and the second visual information may be provided to the user.

In operation S22, a user command may be received through a touch. For example, a user touch input may be recognized by activating the second touch recognizing unit 132 in (e.g., formed in) the second surface 122 of the second display unit 120. The second display unit 120 is disposed at the overlap position and receives a touch signal through the second surface 122 thereof, and thus the user may drive the dual display apparatus 100 through an intuitive touch input.

Next, a case where operation S30 is performed will now be described. Operation S30 includes operations S31 and S32, according to an embodiment of the present invention.

Operation S30 is performed when the program being executed in the dual display apparatus 100 does not require driving of both the first display unit 110 and the second display unit 120, for example, when a home screen is being executed, or the first visual information I1 and the second visual information I2 do not need to be simultaneously (or concurrently) output such as when a news search is being performed.

In operation S31, the control unit 160 may activate the second display unit 120 and inactivate the first display unit 110. If the first display unit 110 is inactivated, a screen of the first display unit 110 may be blacked out, and the second display unit 120 may output the second visual information I2.

For example, referring to FIG. 5, menu icons M1, M2, M3, and M4 (which may be higher than a specific priority level) are displayed on the second display unit 120 (at least one of the menu icons M1, M2, M3, and M4 that are higher than the specific priority level may be displayed on the second display unit 120). The user may select and set the menu icons M1, M2, M3, and M4 (e.g., the menu icons that are higher than the specific priority level) in advance.

In operation S32, a user command may be received through a touch. For example, a user touch input may be recognized by activating the second touch recognizing unit 132 in (e.g., formed in) the second surface 122 of the second display unit 120. The second display unit 120 overlaps the first display unit 110 and receives a touch signal through the second surface 122 thereof, and thus the user may drive the dual display apparatus 100 through an intuitive touch input.

Next, a case where operation S40 is performed will now be described. Operation S40 includes operations S41 and S41, according to an embodiment of the present invention.

Operation S40 is performed when the program being executed in the dual display apparatus 100 does not require driving of both the first display unit 110 and the second display unit 120, for example, when a home screen is being executed, or the first visual information I1 and the second visual information I2 do not need to be simultaneously (or concurrently) output such as when a news search is being performed.

In operation S41, the control unit 160 activates the first display unit 110 and inactivates the second display unit 120. If the second display unit 120 is inactivated, the second display unit 120 does not output the second visual information I2, and the first visual information I1 output through the first display unit 110 may pass through the transparent second display unit 120 and may be viewed (e.g., recognized) by the user.

Although the menu icons M1, M2, M3, and M4 that are higher than the priority level may be displayed on the second display unit 120 as described above with reference to FIG. 5, menu icons that are higher than a priority level may be displayed on the first display unit 110, are capable of being seen through the transparent second display unit 120, and be visually recognized by the user in another embodiment.

In operation S42, a user command may be received through sound. For example, although the second display unit 120 is disposed at the overlap position, when the second display unit 120 is inactivated, the second touch recognizing unit 132 may also be inactivated, which makes it difficult to recognize a user touch input even if the second surface 122 of the second display unit 120 is touched. In this case, the user sound command may be recognized by activating the sound recognizing unit 150. The user sound command may be input into the control unit 160 through the sound recognizing unit 150. The control unit 160 may control driving of the dual display apparatus 100 according to the recognized sound command.

As described above, in operation S12, the control unit 160 determines whether or not the second display unit 120 covers the first display unit 110 based on the detection of operation S11 (also described above). The case where the second display unit 120 does not cover the first display unit 110, that is the second display unit 120 is disposed at the non-overlap position will now be described in reference to operation S50. S50 includes operations S51 and S52, according to an embodiment of the present invention.

In operation S51, the control unit 160 activates both the first display unit 110 and the transparent second display unit 120. The first visual information I1 output through the activated first display unit 110 and the second visual information I2 output through the activated second display unit 120 may be different visual information.

For example, referring to FIG. 6, a screen that runs a web browser may be output as the first visual information I1 through the first display unit 110, and a virtual keyboard for inputting a keyword into the web browser may be output as the second visual information I2 through the second display unit 110.

In operation S52, a user command may be received through a touch input. A user touch input may be recognized through the first touch recognizing unit 131 and/or the second touch recognizing unit 132 in (e.g., formed in) the first display unit 110 and the second display unit 120, respectively. Recognition of touch signals of the first touch recognizing unit 131 and the second touch recognizing unit 132, and outputting of visual information of the first display unit 110 and the second display unit 120 may be performed separately or in combination.

In an embodiment, the second display unit 120 outputs a plurality of menu icons, and the first display unit 110 outputs a screen that runs one of the menu icons output by the second display unit 120. In this case, if the user touches the screen output by the first display unit 110, the first touch recognizing unit 131 receives the touch input so that visual information according to the touch input may be output through the first display unit 110. If the user touches one of the menu icons output by the second display unit 120, the second touch recognizing unit 132 in (e.g., formed in) the first surface 121 of the second display unit 120 may receive the touch input so that a screen that runs the touch menu icon may be output through the second display unit 120. Recognition of touch signals by the first touch recognizing unit 131 and the second touch recognizing unit 132 and outputting of visual information of the first display unit 110 and the second display unit 120 may be separately performed.

In another embodiment the second display unit 120 outputs a plurality of menu icons, and the first display unit 110 outputs a screen that runs one of the menu icons output by the second display unit 120. If the user touches one of the menu icons output by the second display unit 120, the second touch recognizing unit 132 in (e.g., formed in) the first surface 121 of the second display unit 120 may receive the touch input so that a screen that runs the touch menu icon may be output through the first display unit 110. Recognition of touch signals of the first touch recognizing unit 131 and the second touch recognizing unit 132 and output of visual information of the first display unit 110 and the second display unit 120 may be performed in combination.

In another embodiment, recognition of touch signals by the first touch recognizing unit 131 and the second touch recognizing unit 132 and outputting of visual information of the first display unit 110 and the second display unit 120 may be performed in combination as follows.

For example, as shown in FIG. 6, the screen that runs the web browser is output through the first display unit 110. In this regard, in a case where the user touches a search window on the screen output by the first display unit 110, the first touch recognizing unit 131 receives the user touch input and transfers the user touch input to the control unit 160.

The control unit 160 controls the second display unit 120 to output a virtual keyboard screen for inputting a search word based on a received signal. If the user touches the virtual keyboard screen output by the second display unit 120, the second touch recognizing unit 132 receives the user touch input and transfers the user touch input to the control unit 160. The control unit 160 may display the search word on the search window of the first display unit 110 according to a touched keyboard.

As described above, according to an embodiment of the present invention, a user command may be recognized in various ways, and various types of visual information may be output according to relative locations of a first display unit and a transparent second display unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dual display apparatus comprising:
a first display configured to display first visual information and to receive a touch input;
a second display comprising a double-sided emission type display configured to display second visual information through a first surface or a second surface opposite to the first surface and to receive the touch input;
a sensor configured to sense relative locations of the first display and the second display; and
a controller configured to determine whether or not the second display is covering the first display according to a signal of the sensor, and configured to control the first display and the second display,
wherein the sensor comprises:
a first sensor at one side of the first display and positioned to face the second display when the second display covers the first display; and
a second sensor at one side of the second display and positioned to face the first display when the second display covers the first display,
wherein the controller is configured to calculate an angle between the first display and the second display according to signals received from the first sensor and the second sensor, and
wherein the controller is further configured to receive the touch input from the second display when the second display covers the first display, and to receive the touch input from the first display when the second display does not cover the first display.

2. The dual display apparatus of claim 1, wherein the second display comprises an organic light emitting display that is substantially transparent.

3. The dual display apparatus of claim 1, wherein one side of the second display is coupled to the first display so that the second display is configured to rotate and move with respect to the first display.

4. The dual display apparatus of claim 1, wherein the first sensor and the second sensor comprise gyro sensors.

5. The dual display apparatus of claim 1, wherein the controller is configured to activate one of the first display or the second display and to inactivate another one of the first display or the second display when the second display covers the first display, and configured to activate both the first display and the second display when the second display does not to cover the first display.

6. The dual display apparatus of claim 5, wherein the controller is configured to inactivate the first display, to activate the second display, and to control the second display to display menu icons when the second display covers the first display.

7. The dual display apparatus of claim 1, further comprising: a sound sensor configured to sense a sound signal for controlling the dual display apparatus.

8. The dual display apparatus of claim 7, wherein the controller is configured to activate the first display, to inactivate the second display, and to control the sound sensor to be activated when the second display covers the first display.

9. The dual display apparatus of claim 1, wherein the controller is configured to activate the first display and the second display to output third visual information, which is obtained by overlapping the first visual information and the second visual information, to a user when the second display covers the first display.

10. The dual display apparatus of claim 1, wherein the second visual information is displayed on the first surface of the second display when the second display does not cover the first display, and the second visual information is displayed on the second surface of the second display when the second display covers the first display.

11. A method of driving a dual display apparatus, the method comprising:
    detecting, by a sensor, relative locations of a first display and a second display;
    determining, by a controller, whether or not the second display, which comprises a substantially transparent portion, covers the first display according to a signal of the sensor;
    if it is determined that the second display is covering the first display, activating at least one of the first display or the second display; and
    if it is determined that the second display is covering the first display, receiving a sound signal or a touch signal,
    wherein the sensor comprises:
        a first sensor at one side of the first display and positioned to face the second display when the second display covers the first display; and
        a second sensor at one side of the second display and positioned to face the first display when the second display covers the first display,
    wherein the controller calculates an angle between the first display and the second display according to signals received from the first sensor and the second sensor, and
    wherein the second display comprises a double-sided emission type display configured to display second visual information through a first surface or a second surface opposite to the first surface.

12. The method of claim 11, wherein the activating of the at least one of the first display or the second display comprises: activating the first display and inactivating the second display so that first visual information that is output through the first display is output to a user through the substantially transparent portion of the second display.

13. The method of claim 12, wherein the receiving of the sound signal or the touch signal comprises: receiving the sound signal for controlling the dual display apparatus.

14. The method of claim 11, wherein the activating of the at least one of the first display or the second display comprises: activating the second display and inactivating the first display.

15. The method of claim 14, wherein the receiving of the sound signal or the touch signal comprises: receiving the touch signal for controlling the dual display apparatus through the second surface of the second display opposite to the first surface that faces the first display.

16. The method of claim 14, wherein the activating of the at least one of the first display or the second display comprises: displaying menu icons through the second display.

17. The method of claim 11, wherein the activating of the at least one of the first display or the second display comprises:
    activating the first display that outputs first visual information; and
    activating the second display that outputs second visual information.

18. The method of claim 17, wherein the first visual information and the second visual information overlap at least partially to form third visual information.

19. The method of claim 17, wherein the receiving of the sound signal or the touch signal comprises: receiving the touch signal for controlling the dual display apparatus through the second surface of the second display opposite to the first surface thereof that faces the first display.

20. The method of claim 11, wherein the second visual information is displayed on the first surface of the second display when the second display does not cover the first display, and the second visual information is displayed on the second surface of the second display when the second display covers the first display.

* * * * *